Figure 1:
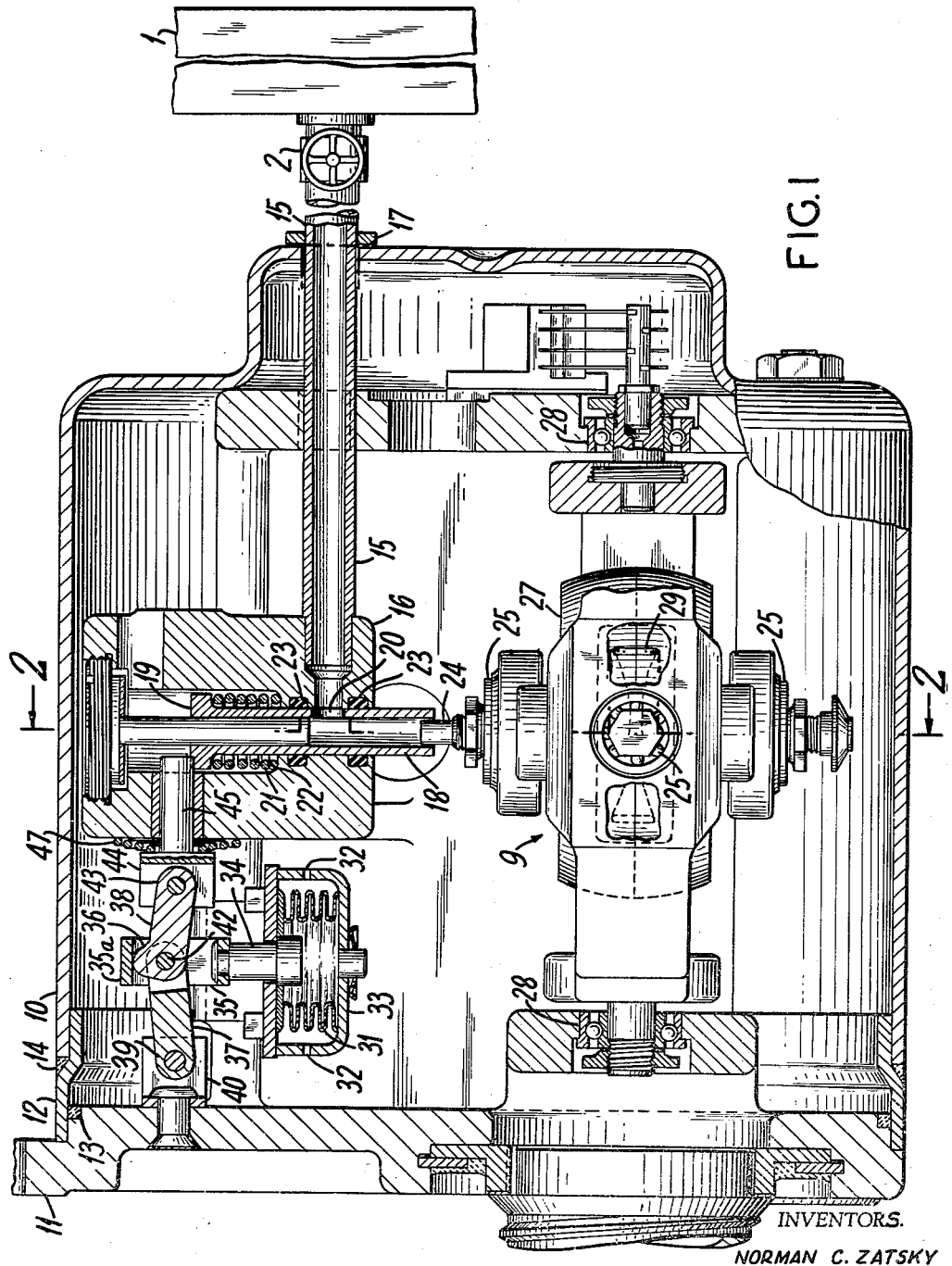

3,192,777
HIGH PRESSURE GAS ENERGIZED GYROSCOPE
Norman C. Zatsky, Huntington, and Lawrence J. Lief, New Rochelle, N.Y., assignors to the United States Time Corporation, Waterbury, Conn., a corporation of Connecticut
Filed July 5, 1962, Ser. No. 207,490
4 Claims. (Cl. 74—5.12)

This invention relates to gyroscope energization systems and more specifically to gyroscope energization systems utilizing a fixed quantity of high pressure gas supplied from an external source.

A feature of this invention is a compact, single-shot gyroscope capable of being energized by a fixed quantity of compressed gas situated external to the housing of the gyroscope, such compressed gas frequently having utility as an energy source in connection with other controls in the vehicle or projectile of which the gyroscope is a part. Known gyroscope systems for this purpose have used energizing means such as electric motors, pyrotechnic devices or compressed gas derived from a compressor or pressure bottle specifically provided for that purpose.

These known systems generally required additional mechanical elements or power supplies, as for example; electrical windings within the mechanism to produce magnetic reaction propulsion; pyrotechnic devices requiring the utilization of dangerous combustible material; and gas driven gyroscopes requiring their own source of compressed gas. The need has long been apparent for a gyroscope of simple construction which could be made to operate on a specified quantity of energy "borrowed" from a source of energy common to other devices within the common system. The invention herein capitalizes on such a source, namely, compressed gas and can be designed with fewer and lighter parts, thereby saving weight while also providing more dependable operation.

In arrangements of this type using a common gas power source, only a small amount of the common compressed gas can be allotted for the energizing of the gyroscope and therefore the gyroscope must provide for the shutting-off of the gas after the rotating mass has reached required operating speed. This shutting-off is reliably accomplished in the present invention with a minimum of moving parts.

One feature of the invention is the delivery of the compressed gas through the axis of the rotating mass to a central cavity therein and thence via radial ducts, to the surface of the rotating mass where its tangential expulsion, as a jet, results in rotation of the rotatable mass. After the gas has been expelled from the jets, it is confined in the hermetically sealed housing raising the ambient interior pressure to a predetermined level whereupon the shut-off mechanism is actuated.

In operation the compressed gas passes through the hollow axis of the rotating mass into a central cavity of the rotating mass and from there it is expelled through tangentially directed jet orifices into an hermetically sealed housing. The housing is equipped with, among other things, an accurately adjusted pressure sensitive bellows. When the pressure of the exhaust gas in the housing reaches a predetermined level, the pressure sensitive bellows collapses thereby motivating a spring actuated trip link mechanism to release a spring loaded axial gas delivery tube, or slide valve, connected to the gyroscope shaft. Release of the slide valve effects closure of the main gas supply line and simultaneous uncaging of the gyroscope rotor thus making it available to provide positional error signal information.

The following text describes a preferred embodiment of the invention.

Figure 2:
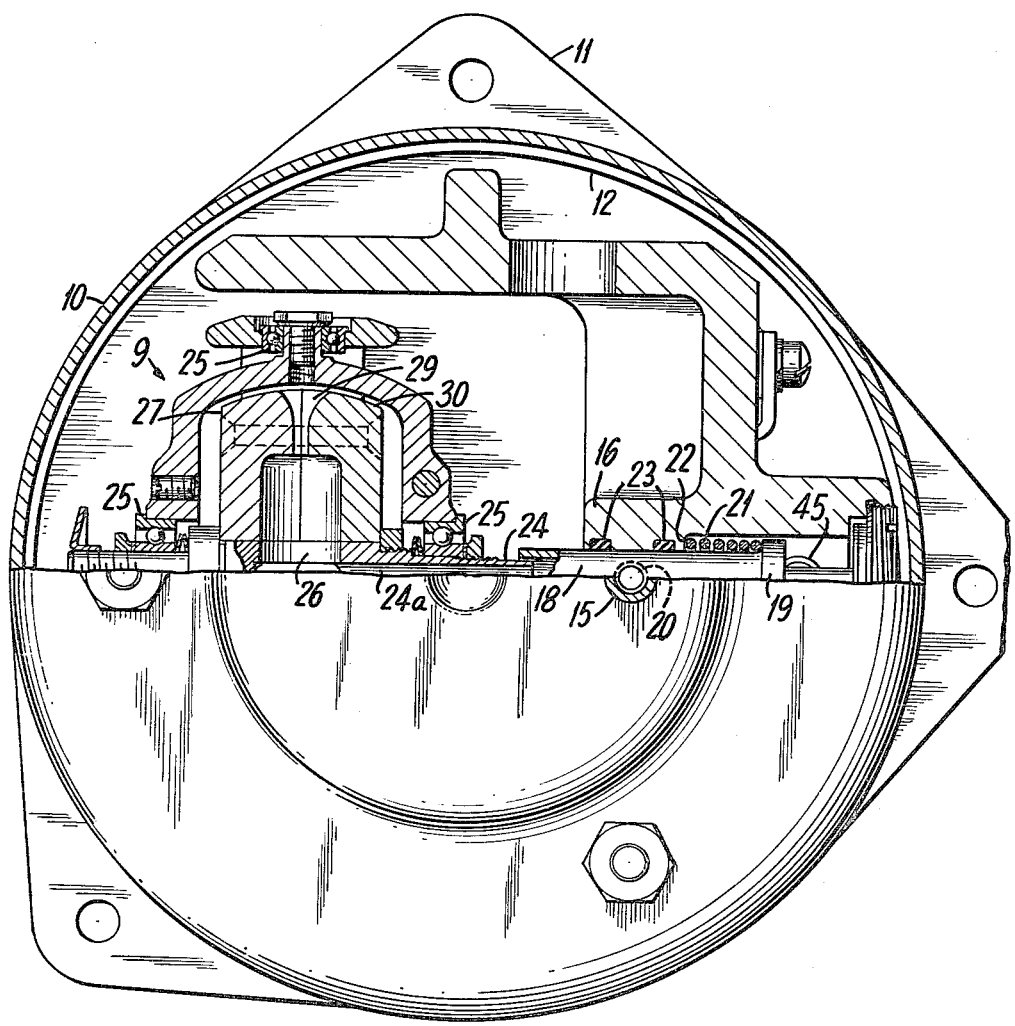

In the drawings,
FIG. 1 is a side elevation of the gyroscope with the external housing broken away to show the essential elements; and
FIG. 2 illustrates a partial cross-sectional view of the arrangement taken along line 2—2 of FIG. 1.

The housing 10 is a cylindrically shaped cover, hermetically sealed to base plate 11 by means of a circular channel member 12 soldered to the members at 13 and 14. Tube 15 passes through the housing 10, and terminates in block member 16. An hermetic seal for tube 15 is provided on the external surface of cover 10 by means of solder 17.

Machined member 16 contains a hollow tube, or slide valve 18 aligned axially with the initial axis position of the rotating mass. Tube 18 has a flange 19 and valve port 20 aligned with the end of gas delivery tube 15. Encircling axial tube 18 is a spring 21 shown in compressed position. Spring 21 abuts the lower shoulder of flange 19 and shoulder 22 of the block 16. Two O-ring grommets 23 secure tube member 18 in gas-tight slidable relation within the block 16. The hollow drive shaft 24 of the gyroscope mechanism, generally indicated at 9, is disposed for rotation, with running clearance, within the end of the gas delivery tube 18.

The hollow drive shaft 24, an integral part of the gyroscope rotor 27, is supported for rotation in the bearings 25. Rotor 27 is held in free-floating fashion with respect to housing 10 by means of gimbal bearings 28. Drive shaft 24 has a hollow passage 24a communicating with the chamber 26 within the rotor 27. The internal chamber 26 communicates to the external surface of rotor 27 through jet orifices 29, so arranged that the gas discharge therefrom is tangentially directed in complementary fashion along its exterior surface 30.

In addition, housing 10 contains a pressure sensitive bellows 31 which communicates, through ports 32 in its housing 33, to the interior space hermetically enclosed by housing 10. Bellows apparatus 31 is provided with an arm 34 and a trip lever 35.

Trip lever 35 has, at its outer end, a projecting finger 35a disposed to engage a toggle mechanism connected to latch pin 45. The toggle mechanism comprises two links 37 and 38 pivotally interconnected by a rivet 42. Link 37 is pivotally connected, at its free end 39, to a stationary member 40 mounted on the plate 11. Link 38 is pivotally connected, at its free end 43, to the end portion 44 of the latch pin 45. Link 38 is further provided, at its other movable end, with a camming surface 36 engaged by the actuating finger 35a of the aneroid bellows mechanism. Between the block 16 and the end 44 of the latch pin 45 is a spiral spring 47, shown in the compressed position, tending to bias the latch pin 45 outwardly. The free end of the latch pin 45, as illustrated in FIG. 1, projects through block 16 and acts as a retaining element, in combination with the shoulder 19 of the slide valve member 18, to maintain the slide member 18 in cooperative coupling relationship to the gyro shaft 24.

In operation, when it is desired to energize the gyro mechanism, high pressure air is admitted from an external source 1, via valve 2 (opened either electrically or mechanically) and directed into input pipe 15. The high pressure air passes through port 20 in the slide valve 18, and into the gyro 9 causing it to rotate at high velocity.

As the velocity of the rotor increases, the air pressure within the housing 10 increases proportionately towards the pressure of the air source. At the desired final speed of rotation the pressure within the cannister will reach a predetermined level at which the aneroid bellows has been preset to collapse. On collapse of the bellows 31, the toggle mechanism will be pulled past the dead center position and, with the assistance of compressed spring 47, the latch pin 45 will be forcefully withdrawn from the block 16 sufficiently to allow the spring loaded slide valve 18 to move leftwardly into the cavity provided in block 16. This movement of the slide valve 18 disconnects the valve from the gyro shaft 24 and seals off the high pressure supply pipe 15 as the opening 20 in the valve moves out of alignment with it.

The electrical circuitry connecting the gyro to the external circuits, being well known, has been omitted from the drawings. Similarly, the shape and locations of the jet orifices within the gyro rotor, being well known, have not been discussed in detail nor made a part of this invention.

By way of illustration, an experimental model of the gyroscope was attached to a source of gas having an initial pressure of 3000 p.s.i. and the gyroscope was brought up to operating speed of 19,000 r.p.m., uncaged and simultaneously disconnected from the gas supply on a total dissipation of only about 2.50 cubic inches of gas, within a time of approximately 80 milliseconds.

We claim:

1. A gas powered gyroscope mechanism comprising a hermetically sealed chamber, a gyroscope assembly disposed within said chamber, a gas supply input conduit leading into said chamber, a valve mechanism disposed within said chamber removably interconnecting said conduit and said gyroscope and controlling the gas into said chamber, said gyroscope being adapted to operate from energy stored in said gas and to discharge energy depleted gas into said chamber, pressure sensitive means disposed within said chamber and responsive to the pressure of the energy depleted gas, and actuator means interconnecting said pressure sensitive means and said valve mechanism to actuate said valve mechanism on response of the pressure sensitive means and thereby to disconnect said conduit from said gyroscope and to shut off the flow of gas into said gyroscope when the internal pressure of the energy depleted gas has attained a predetermined value.

2. The mechanism as in claim 1 wherein said gyroscope comprises a rotatable mass having an integral hollow shaft, said shaft being disposed for rotation, said rotatable mass having an internal cavity communicating with said hollow shaft and further having a plurality of jet orifices communicating between said cavity and the periphery of said mass, whereby high pressure gas admitted into said mass through the hollow shaft discharges from the peripheral orifices causing said mass to rotate.

3. The combination defined in claim 1 wherein said valve mechanism is a spring-biased hollow slide valve having a transverse gas inlet port normally biased into alignment with said gas supply conduit, and said gyroscope has a hollow tubular gas input conduit normally disposed within the hollow slide valve, whereby actuation of said actuator means releases said slide valve inlet port from alignment with said input gas conduit and disconnects said gyroscope input conduit from engagement with said hollow slide valve.

4. The mechanism of claim 1 wherein the gas supply is a small quantity of high pressure gas bled from a large storage chamber of high pressure gas normally utilized for other purposes, the gas supply input is a conduit interconnecting said large storage chamber and said hermetically sealed chamber, and the mechanism also comprises normally closed valve means in series with said conduit and said large storage chamber adapted to be opened to initiate the operation of said mechanism.

References Cited by the Examiner

UNITED STATES PATENTS 2,315,019  3/43  Samuelson _____ 74—5.7 X

BROUGHTON G. DURHAM, *Primary Examiner.*

DON A. WAITE, *Examiner.*